United States Patent
Choi et al.

(10) Patent No.: US 11,489,643 B2
(45) Date of Patent: Nov. 1, 2022

(54) APPARATUS AND METHODS FOR COMMUNICATING CONFIGURATION INFORMATION OVER A RADIO RESOURCE CHANNEL

(71) Applicant: Samsung Electronics Co., Ltd, Suwon-si (KR)

(72) Inventors: Sangwon Choi, Seoul (KR); Hyunkyu Yu, Suwon-si (KR); Jaewon Kim, Seoul (KR); Peng Xue, Suwon-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/622,890

(22) PCT Filed: Jun. 15, 2018

(86) PCT No.: PCT/KR2018/006768
§ 371 (c)(1),
(2) Date: Dec. 13, 2019

(87) PCT Pub. No.: WO2018/230994
PCT Pub. Date: Dec. 20, 2018

(65) Prior Publication Data
US 2020/0213058 A1 Jul. 2, 2020

(30) Foreign Application Priority Data
Jun. 15, 2017 (KR) .................. 10-2017-0075896

(51) Int. Cl.
*H04L 5/00* (2006.01)
*H04L 1/16* (2006.01)
(Continued)

(52) U.S. Cl.
CPC ......... *H04L 5/0053* (2013.01); *H04B 7/0404* (2013.01); *H04B 7/0408* (2013.01);
(Continued)

(58) Field of Classification Search
CPC . H04L 5/0053; H04L 1/1607; H04L 61/6022; H04L 5/0023; H04L 5/0044;
(Continued)

(56) References Cited

U.S. PATENT DOCUMENTS 9,468,022 B2    10/2016  Li et al.
2014/0119266 A1*  5/2014  Ng .................. H04L 27/2602
                                                    370/312
(Continued)

FOREIGN PATENT DOCUMENTS

KR    10-2015-0100653 A    9/2015
KR    10-2018-0108375 A    10/2018
WO       2018140176 A1     8/2018

OTHER PUBLICATIONS

LG Electronics, "Discussion on DL beam management", 3GPP TSG RAN WG1 Meeting #88bis, Apr. 3-7, 2017, R1-1704877, 6 pages.
(Continued)

*Primary Examiner* — Omar J Ghowrwal

(57) ABSTRACT

The present disclosure relates to a 5th generation (5G) or pre-5G communication system for supporting a higher data transmission rate beyond a 4th generation (4G) communication system such as long term evolution (LTE). The present disclosure is to transmit a downlink control channel in a wireless communication system. An operation method of a base station comprises the steps of: transmitting information on a configuration of a control channel using a plurality of transmission beams; transmitting control information through the control channel, using the plurality of transmission beams; and transmitting data through a data
(Continued)

channel allocated by the control information, using at least one of the plurality of transmission beams.

13 Claims, 27 Drawing Sheets

(51) Int. Cl.
| | | |
|---|---|---|
| *H04W 72/04* | (2009.01) | |
| *H04W 76/27* | (2018.01) | |
| *H04W 88/08* | (2009.01) | |
| *H04B 7/0404* | (2017.01) | |
| *H04B 7/0408* | (2017.01) | |
| *H04B 7/06* | (2006.01) | |
| *H04B 7/08* | (2006.01) | |
| *H04W 72/12* | (2009.01) | |
| *H04L 101/622* | (2022.01) | |

(52) U.S. Cl.
CPC ......... *H04B 7/0617* (2013.01); *H04B 7/0695* (2013.01); *H04B 7/088* (2013.01); *H04L 1/1607* (2013.01); *H04L 5/0023* (2013.01); *H04L 5/0044* (2013.01); *H04L 5/0094* (2013.01); *H04W 72/042* (2013.01); *H04W 72/046* (2013.01); *H04W 72/1278* (2013.01); *H04W 76/27* (2018.02); *H04W 88/08* (2013.01); *H04L 2101/622* (2022.05)

(58) Field of Classification Search
CPC .. H04L 5/0094; H04W 76/27; H04W 72/042; H04W 88/08; H04W 72/046; H04W 72/1278; H04B 7/0404; H04B 7/088; H04B 7/0695; H04B 7/0617; H04B 7/0408

See application file for complete search history.

(56) References Cited

U.S. PATENT DOCUMENTS

| | | | | |
|---|---|---|---|---|
| 2017/0367046 | A1* | 12/2017 | Papasakellariou | H04L 5/0048 |
| 2018/0076940 | A1* | 3/2018 | Zhou | H04L 5/0048 |
| 2018/0220403 | A1* | 8/2018 | John Wilson | H04B 7/0639 |
| 2018/0227156 | A1* | 8/2018 | Papasakellariou | H04W 72/0453 |
| 2019/0306847 | A1* | 10/2019 | Seo | H04L 5/0053 |
| 2020/0028651 | A1* | 1/2020 | Xu | H04L 5/0023 |
| 2021/0076445 | A1* | 3/2021 | Tsai | H04W 76/19 |

OTHER PUBLICATIONS

Nokia et al., "On beam grouping and reporting", 3GPP TSG-RAN WG1 Meeting #88bis, Apr. 3-7, 2017, R1-1705959, 12 pages.
Catt, "Discussion on DL beam management", 3GPP TSG RAN WG1 Meeting #89, May 15-19, 2017, R1-1707475, 10 pages.
MediaTek Inc., "Details on DL Beam Management", 3GPP TSG RAN WG1 Meeting #89, May 15-19, 2017, R1-1707830, 8 pages.
Samsung, "Multibeam Transmission for PDCCH", 3GPP TSG RAN WG1 Meeting #90, Aug. 21-25, 2017, R1-1713614, 6 pages.
International Search Report dated Oct. 1, 2018 in connection with International Patent Application No. PCT/KR2018/006768, 2 pages.
Written Opinion of of the International Searching Authority dated Oct. 1, 2018 in connection with International Patent Application No. PCT/KR2018/006768, 7 pages.
Supplementary European Search Report in connection with European Application No. 18818098.8 dated Apr. 9, 2020, 11 pages.
Huawei, et al., "Multi-beam transmission for robustness," R1-1708136, 3GPP TSG RAN WG1 Meeting #89, Hangzhou, China, May 15-19, 2017, 5 pages.
Interdigital Communications, "Beam management of multiple beam pair in uplink," R2-1702883, 3GPP TSG-RAN WG2 #97bis, Spokane, Washington, Apr. 3-7, 2017, 3 pages.
LG Electronics, "Discussion on DL beam management," R1-1707604, 3GPP TSG RAN WG1 Meeting #89, Hangzhou, China, May 15-19, 2017, 7 pages.
Samsung, "Multi-beam Transmission for NR-PDCCH," R1-1707987, 3GPP TSG-RAN WG1 Meeting #89, Hangzhou, China, May 15-19, 2017, 7 pages.
Korean Intellectual Property Office, "Notice of Preliminary Rejection" dated Nov. 3, 2021, in connection with Korean Patent Application No. 10-2017-0075896, 11 pages.
Korean Intellectual Property Office, "Notice of Preliminary Rejection" dated Feb. 7, 2022, in connection with Korean Patent Application No. 10-2017-0075896, 8 pages.
Intel Corporation, "Details for UL Beam management" 3GPP TSG-RAN WG1 #88bis, R1-1707354, Hangzhou, China, May 15-19, 2017, 8 pages.
Korean Intellectual Property Office, "Notice of Final Rejection" issued May 3, 2022, in connection with Korean Patent Application No. 10-2017-0075896, 8 pages.
Korean Intellectual Property Office, "Notice of Patent Grant," issued Aug. 9, 2022, in connection with Korean Patent Application No. KR10-2017-0075896, 5 pages.
Guangdong OPPO Mobile Telecom, "Beam association relationship between data and control channels," 3GPP TSG RAN WG1 Meeting 89, R1-1707699, Hangzhou, P.R. China, May 15-19, 2017, 2 pages.
Intel Corporation, "PDCCH transmission schemes and multi-beam operation," 3GPP TSG RAN WG1 Meeting 89, R1-1707378, Hangzhou, P.R. China, May 15-19, 2017, 3 pages.

* cited by examiner

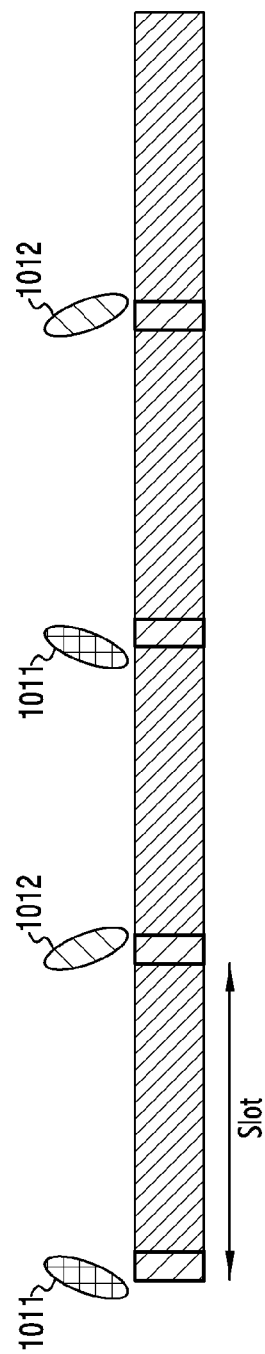

APPARATUS AND METHODS FOR COMMUNICATING CONFIGURATION INFORMATION OVER A RADIO RESOURCE CHANNEL

CROSS-REFERENCE TO RELATED APPLICATIONS

This application is a 371 of International Application No. PCT/KR2018/006768 filed on Jun. 15, 2018, which claims priority to Korean Patent Application No. 10-2017-0075896 filed on Jun. 15, 2017, the disclosures of which are herein incorporated by reference in their entirety.

1. FIELD

The disclosure relates generally to a wireless communication system and, more specifically, to an apparatus and method for transmitting a downlink control channel in a wireless communication system.

2. DESCRIPTION OF RELATED ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, the introduction of beamforming technology has been discussed in order to improve channel gain. Accordingly, beamforming may be performed on a signal transmitted through various channels such as a control channel and a data channel.

SUMMARY

On the basis of the aforementioned discussion, the disclosure provides an apparatus and method for transmitting a downlink control channel in a wireless communication system by using beamforming.

In addition, the disclosure provides an apparatus and method for performing beamforming in consideration of the characteristic of a channel in a wireless communication system.

In addition, the disclosure provides an apparatus and method for transmitting a downlink control channel by using a plurality of transmission beams in a wireless communication system.

In addition, the disclosure provides an apparatus and method for providing information of beams allocated to a control channel in a wireless communication system.

In addition, the disclosure provides an apparatus and method for transmitting a data channel corresponding to a downlink control channel transmitted by using a plurality of transmission beams in a wireless communication system.

In addition, the disclosure provides an apparatus and method for feeding back an acknowledgement (ACK)/negative ACK (HACK) relating to a data channel corresponding to a downlink control channel transmitted by using a plurality of transmission beams in a wireless communication system.

According to various embodiments of the disclosure, a method for operating a base station in a wireless communication system includes: transmitting information regarding a configuration of a control channel using a plurality of transmission beams; transmitting control information through the control channel by using the plurality of transmission beams; and transmitting data through a data channel allocated by the control information, by using at least one of the plurality of transmission beams.

According to various embodiments of the disclosure, a method for operating a terminal in a wireless communication system includes: receiving information regarding a configuration of a control channel using a plurality of transmission beams; receiving control information through the control channel by using at least one of a plurality of reception beams paired with the plurality of transmission beams; and receiving data through a data channel allocated by the control information, by using at least one of the plurality of reception beams.

According to various embodiments of the disclosure, an apparatus for a base station in a wireless communication system includes: at least one processor; and a transceiver coupled to the at least one processor. The transceiver is configured to: transmit information regarding a configuration of a control channel using a plurality of transmission beams; transmit control information through the control channel by using the plurality of transmission beams; and transmit data through a data channel allocated by the control information, by using at least one of the plurality of transmission beams.

According to various embodiments of the disclosure, an apparatus for a terminal in a wireless communication system includes: at least one processor; and a transceiver coupled to the at least one processor. The transceiver is configured to: receive information regarding a configuration of a control channel using a plurality of transmission beams; receive control information through the control channel by using at least one of a plurality of reception beams paired with the plurality of transmission beams; and receive data through a data channel allocated by the control information, by using at least one of the plurality of reception beams.

The information regarding the configuration of the control channel may include at least one of: information indicating whether the plurality of transmission beams are used; information regarding a transmission pattern of the control channel; information regarding beam allocation for each transmission instance of the control channel; information regarding at least one of a transmission beam for transmission of the control channel and a reception beam for reception of the control channel; information regarding resource allocation for the control channel; information regarding at least one of a transmission beam for transmission of the data channel and a reception beam for reception of the data channel; and information indicating whether pieces of control information included in control channels transmitted by using the plurality of transmission beams are equal.

According to an apparatus and method according to various embodiments of the disclosure, downlink control information is transmitted by using a plurality of beams, whereby a downlink control channel can be efficiently transmitted.

Effects which can be acquired by the disclosure are not limited to the above described effects, and other effects that have not been mentioned may be clearly understood by those skilled in the art from the following description.

BRIEF DESCRIPTION OF THE DRAWINGS

FIGS. 10A to 10C illustrate examples of a monitoring interval of a downlink control channel in a wireless communication system according to various embodiments of the disclosure;

DETAILED DESCRIPTION

The terms used in the disclosure are only used to describe specific embodiments, and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary among the terms in the disclosure may be interpreted to have the meanings equal or similar to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to an apparatus and method for transmitting or receiving a downlink control channel in a wireless communication system. Specifically, in the disclosure, a technology for transmitting or receiving a control channel and a data channel by using beamforming in a wireless communication system will be described.

In the following description, a term indicating a signal, a term indicating a channel, a term (e.g. index, etc.) indicating control information, a term (e.g. beam pair link (BPL), etc.) indicating a beam, terms indicating network entities, a term indicating an element of an apparatus, and the like are examples used for convenience of explanation. Accordingly, the disclosure is not limited to the following terms and other terms having the same technical meaning may be used. In addition, in the following description, the expression "transmit or receive channel" may be interpreted to mean "transmit or receive signal through channel", and both may be used together.

In addition, in the disclosure, various embodiments are explained by using terms used in a communication protocol (e.g. 3rd generation partnership project (3GPP)), but the embodiments merely correspond to examples for explanation. The various embodiments of the disclosure may be easily modified and applied to other communication systems.

Figure 1:
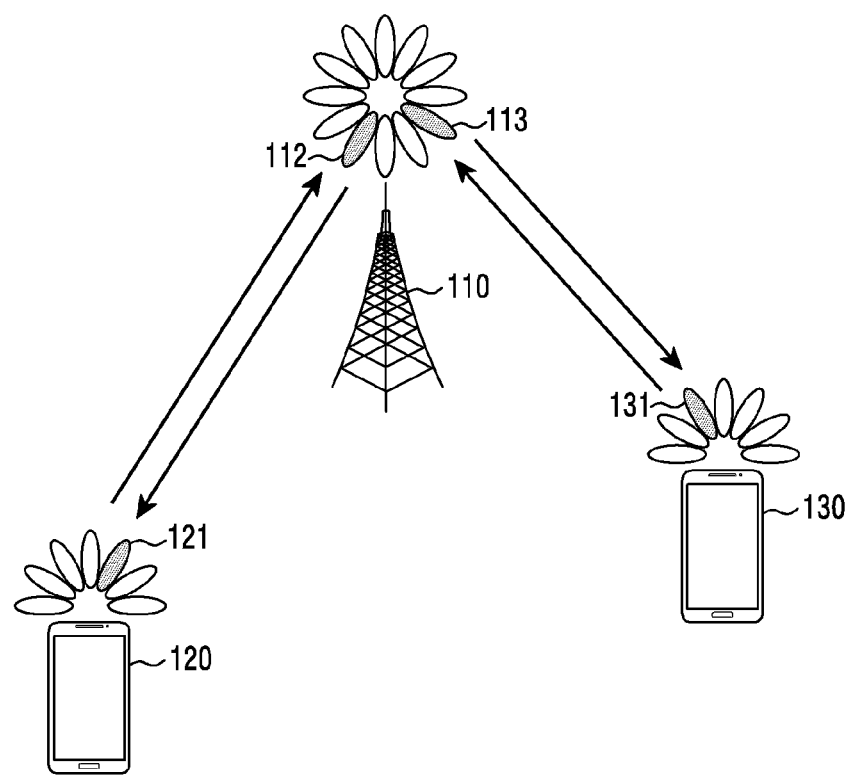
FIG. 1 illustrates a wireless communication system according to various embodiments of the disclosure.

FIG. 1 illustrates a wireless communication system according to various embodiments of the disclosure. FIG. 1 illustrates a base station 110, a terminal 120, and a terminal 130, as a part of nodes using wireless channels in the wireless communication system. FIG. 1 illustrates only one base station, but the wireless communication system may further include another base station identical or similar to the base station 110.

The base station 110 is a network infrastructure providing wireless access to the terminals 120 and 130. The base station 110 has a coverage which is defined as a particular geographical area, based on a distance by which the base station can transmit a signal. The base station 110 may be also called "an access point (AP)", "an eNodeB (eNB)", "a 5$^{th}$ generation node", "a wireless point", "a transmission/reception point (TRP)", or other terms having the same technical meaning.

Each of the terminal 120 and the terminal 130 is a device used by a user and is configured to perform communication with the base station 110 through a wireless channel. In some cases, at least one of the terminal 120 and the terminal 130 may be operated without the involvement of a user. That is, at least one of the terminal 120 and the terminal 130 is a device performing machine type communication (MTC) and may not be carried by a user. Each of the terminal 120 and the terminal 130 may be also called "a user equipment (UE)", "a mobile station", "a subscriber station", "a remote terminal", "a wireless terminal", "a user device" or other terms having the same technical meaning.

The base station 110, the terminal 120, and the terminal 130 may transmit or receive a wireless signal in a mmWave band (e.g. 28 GHz, 30 GHz, 38 GHz, and 60 GHz). In order to improve channel gain, the base station 110, the terminal 120, and the terminal 130 may perform beamforming. Beamforming may include transmission beamforming and reception beamforming. That is, the base station 110, the terminal 120, and the terminal 130 may give directivity to a transmission signal or a reception signal. To this end, the base station 110 and the terminals 120 and 130 may select serving beams 112, 113, 121, and 131 through a beam discovering procedure (beam search procedure) or a beam management procedure. Communication after the selection of the serving beams 112, 113, 121, and 131 may be performed through a resource having a quasi-co-located (QCL) relationship with a resource through which the serving beams 112, 113, 121, and 131 have been transmitted.

Figure 2:
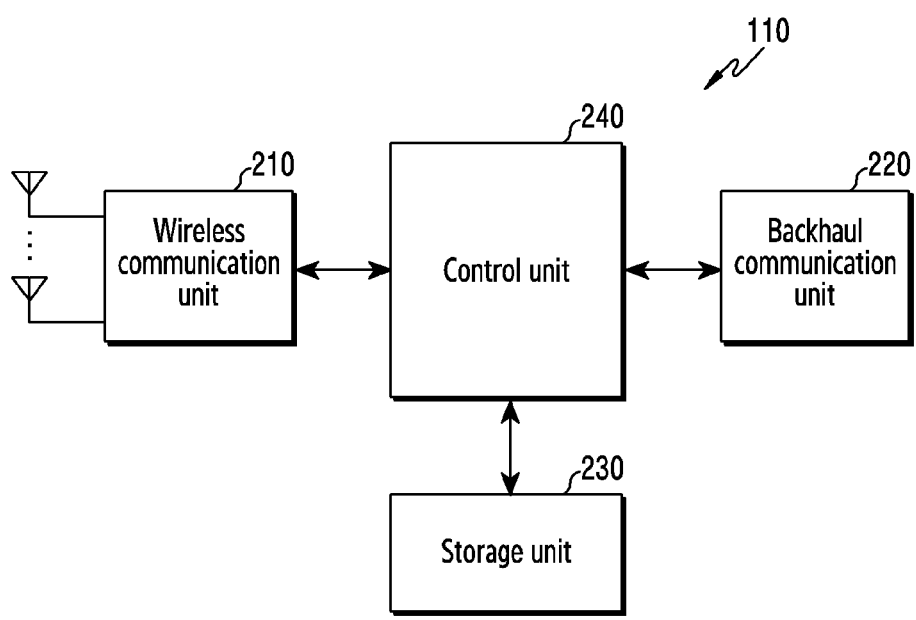
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term "~unit" or "~er" used hereinafter may refer to a constituent unit processing at least one function or operation and may be implemented in hardware, software, or a combination of hardware and software.

Referring to FIG. 2, the base station includes a wireless communication unit 210, a backhaul communication unit 220, a storage unit 230, and a control unit 240.

The wireless communication unit 210 performs functions for transmitting or receiving a signal through a wireless channel. For example, the wireless communication unit 210 performs a function of conversion between a baseband signal and a bit stream according to a physical layer protocol of the system. For example, when data is transmitted, the wireless communication unit 210 generates complex symbols by encoding and modulating a transmission bit stream. Also, when data is received, the wireless communication unit 210 reconstructs a reception bit stream by demodulating and decoding a baseband signal. Also, the wireless communication unit 210 up-converts a baseband signal into a radio-frequency (RF) band signal and then transmits the converted RF band signal through an antenna, and down-converts an RF band signal received through an antenna into a baseband signal.

For example, the wireless communication unit 210 may include a transmission filter, a reception filter, an amplifier, a mixer, an oscillator, a digital-to-analog convertor (DAC), an analog-to-digital convertor (ADC), and the like. Also, the wireless communication unit 210 may include a plurality of transmission/reception paths. Further, the wireless communication unit 210 may include at least one antenna array configured by multiple antenna elements. In view of hardware, the wireless communication unit 210 may be configured by a digital unit and an analog unit, and the analog unit may include a plurality of sub-units according to operating power, operating frequency, etc.

The wireless communication unit 210 transmits and receives a signal, as described above. Accordingly, the entirety or a part of the wireless communication unit 210 may be called "a transmission unit", a reception unit", or "a transceiver". Also, in the following description, transmission and reception through a wireless channel may be understood to include the aforementioned processing of the wireless communication unit 210.

The backhaul communication unit 220 provides an interface performing communication with other nodes within a network. That is, the backhaul communication unit 220 converts, into a physical signal, a bit stream transmitted from the base station to another node, for example, another access node, another base station, a higher node, a core network, etc., and converts a physical signal received from another node into a bit stream.

The storage unit 230 stores data such as a basic program, an application program, and configuration information for the operation of the base station. The storage unit 230 may be configured as a volatile memory, a non-volatile memory, or a combination of a volatile memory and a non-volatile memory. The storage unit 230 provides stored data in response to a request of the control unit 240.

The control unit 240 controls overall operations of the base station. For example, the control unit 240 transmits and receives a signal through the wireless communication unit 210 or the backhaul communication unit 220. Further, the control unit 240 records and reads data in and from the storage unit 230. In addition, the control unit 240 may perform functions of a protocol stack required in a communication protocol. To this end, the control unit 240 may include at least one processor.

According to various embodiments, the control unit 240 controls control information and data relating to the control information to be transmitted by using a plurality of transmission beams. To this end, the control unit 240 may generate information regarding a configuration of a control channel relating to the plurality of transmission beams. Also, the control unit 240 may configure a data channel by considering the plurality of transmission beams and transmit the data through the data channel. For example, the control unit 240 may control the base station to perform the operations described below according to various embodiments.

Figure 3:
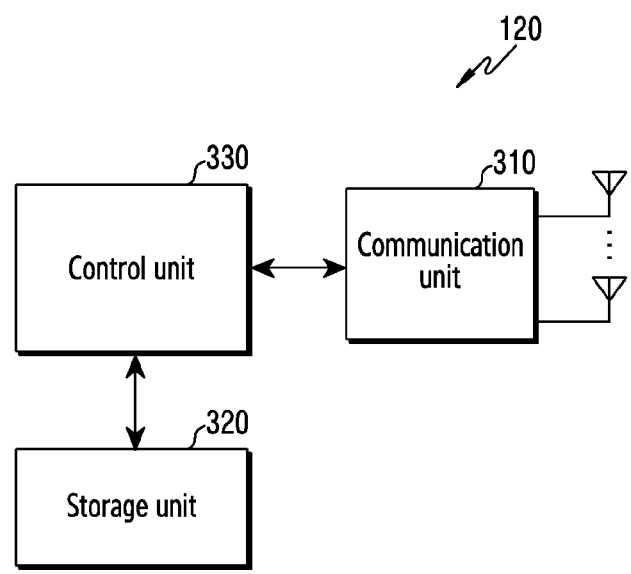
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. The term "~unit" or "~er" used hereinafter may refer to a constituent unit processing at least one function or operation and may be implemented in hardware, software, or a combination of hardware and software.

Referring to FIG. 3, the terminal includes a communication unit 310, a storage unit 320, and a control unit 330.

The communication unit 310 performs functions for transmitting or receiving a signal through a wireless channel. For example, the communication unit 310 performs a function of conversion between a baseband signal and a bit stream according to a physical layer protocol of the system. For example, when data is transmitted, the communication unit 310 generates complex symbols by encoding and modulating a transmission bit stream. Also, when data is received, the communication unit 310 reconstructs a reception bit stream by demodulating and decoding a baseband signal. Also, the communication unit 310 up-converts a baseband signal into an RF band signal and then transmits the converted RF band signal through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array configured by multiple antenna elements. In view of hardware, the communication unit 310 may be configured by a digital circuit and an analog circuit (e.g. radio frequency integrated circuit (RFIC)), and the digital circuit and the analog circuit may be implemented as a single package. Also, the communication unit 310 may include a plurality of RF chains. Further, the communication unit 310 may perform beamforming.

The communication unit 310 transmits and receives a signal, as described above. Accordingly, the entirety or a part of the communication unit 310 may be called "a transmission unit", "a reception unit", or "a transceiver". Also, in the following description, transmission and reception through a wireless channel may be understood to include the aforementioned processing of the communication unit 310.

The storage unit 320 stores data such as a basic program, an application program, and configuration information for the operation of the terminal. The storage unit 320 may be configured as a volatile memory, a non-volatile memory, or a combination of a volatile memory and a non-volatile memory. The storage unit 320 provides stored data in response to a request of the control unit 330.

The control unit 330 controls overall operations of the terminal. For example, the control unit 330 transmits and receives a signal through the communication unit 310. Further, the control unit 330 records and reads data in and from the storage unit 320. In addition, the control unit 330 may perform functions of a protocol stack required in a communication protocol. To this end, the control unit 330 may include at least one processor or microprocessor, or may be a part of a processor. Also, the control unit 330 and a part of the communication unit 310 may be called a communication processor (CP).

According to various embodiments, the control unit 330 controls control information and data relating to the control information to be received by using at least one of a plurality of reception beams. To this end, the control unit 330 may identify, based on signaling from the base station, information regarding a configuration of a control channel relating to the plurality of reception beams. Also, the control unit 330 may receive the data by using a reception beam which is related to or is used for the reception of the control information. For example, the control unit 330 may control the terminal to perform the operations described below according to various embodiments.

Figure 4A:
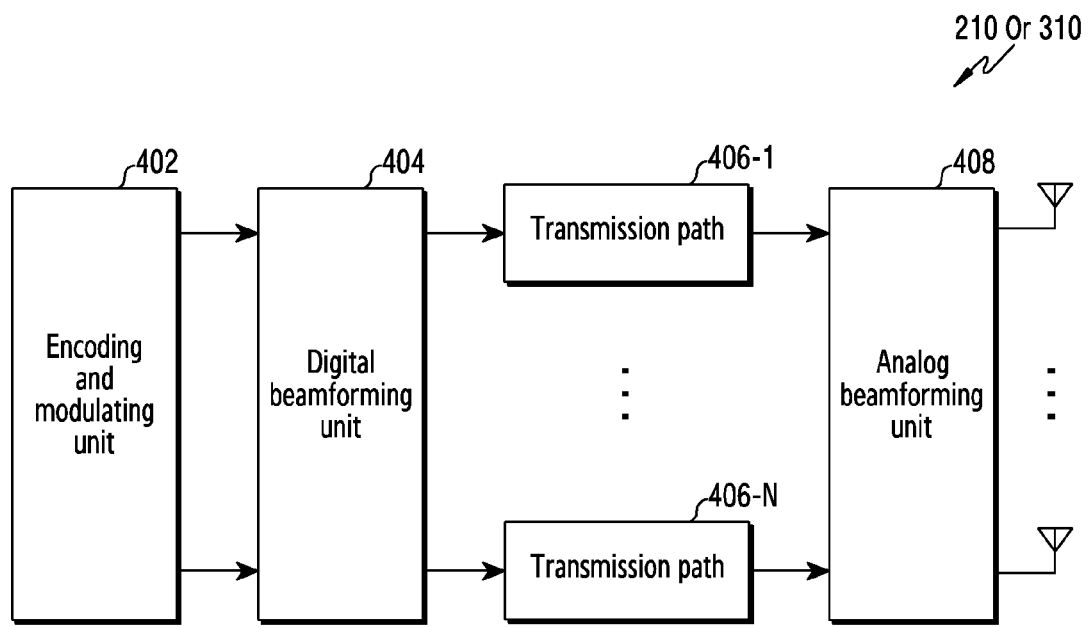
FIGS. 4A to 4C illustrate a configuration of a communication unit in a wireless communication system according to various embodiments of the disclosure.
Figure 4B:
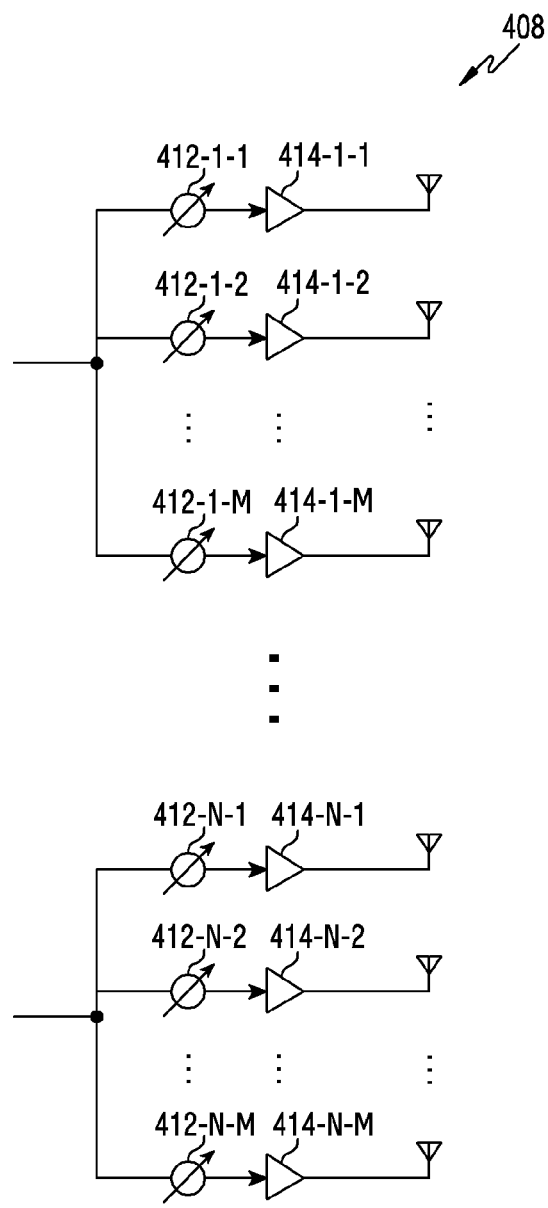
Figure 4C:
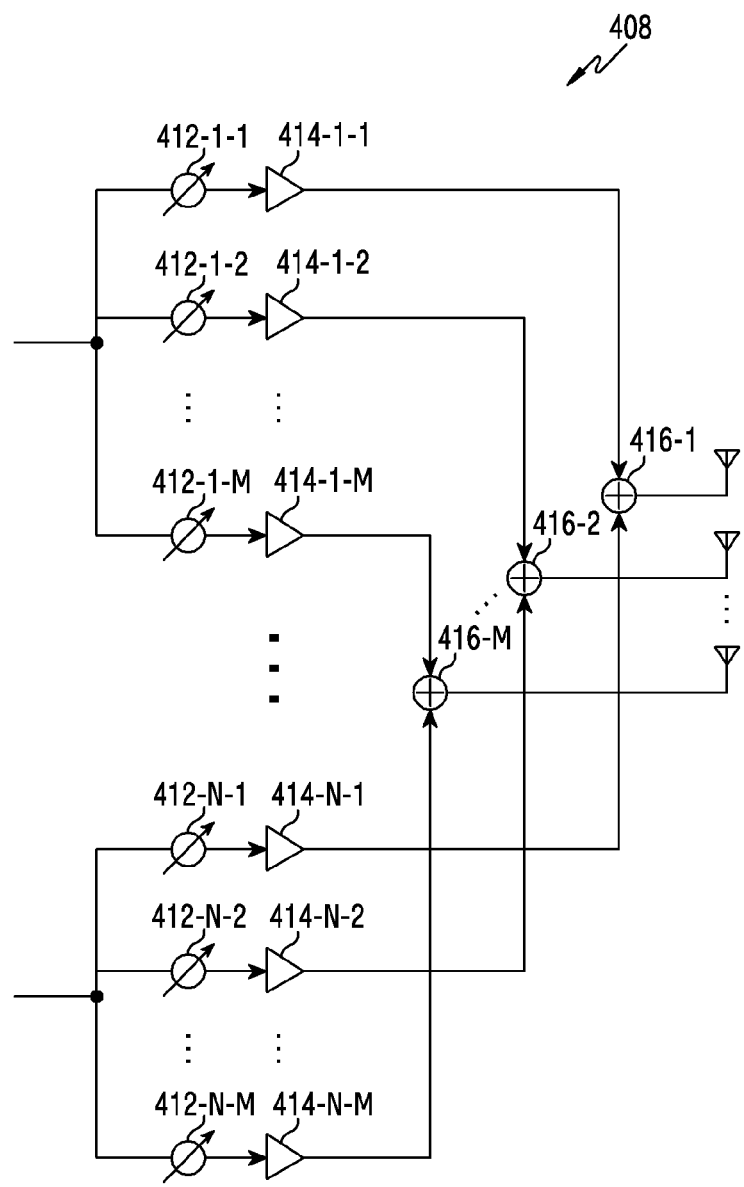

FIGS. 4A to 4C illustrate a configuration of a communication unit in a wireless communication system according to various embodiments of the disclosure. FIGS. 4A to 4C illustrate an example of a specific configuration of the wireless communication unit 210 in FIG. 2 or the communication unit 310 in FIG. 3. Specifically, FIGS. 4A to 4C illustrate elements performing beamforming, which are a part of the wireless communication unit 210 in FIG. 2 or the communication unit 310 in FIG. 3.

Referring to FIG. 4A, the wireless communication unit 210 or the communication unit 310 includes an encoding and modulating unit 402, a digital beamforming unit 404, a plurality of transmission paths 406-1 to 406-N, and an analog beamforming unit 408.

The encoding and modulating unit 402 performs channel encoding. For channel encoding, at least one of a low density parity check (LDPC) code, a convolution code, and a polar code may be used. The encoding and modulating unit 402 generates modulation symbols by performing constellation mapping.

The digital beamforming unit 404 performs beamforming on a digital signal (e.g. modulation symbols). To this end, the digital beamforming unit 404 multiplies beamforming weights to the modulation symbols. The beamforming weights are used for changing the size and the phase of a signal, and may be called "a precoding matrix", "a precoder", etc. The digital beamforming unit 404 outputs, to the plurality of transmission paths 406-1 to 406-N, the modulation symbols, which have been subjected to digital beamforming. According to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert, into analog signals, digital signals having been subjected to digital beamforming. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is designed for an orthogonal frequency division multiplexing (OFDM) scheme, and may be excluded in another physical layer scheme (e.g. filter bank multi-carrier (FBMC)). That is, the plurality of transmission paths 406-1 to 406-N provide independent signal processing processes for multiple streams generated through digital beamforming, respectively. However, according to an implementation method, a part of the elements of the plurality of transmission paths 406-1 to 406-N may be shared.

The analog beamforming unit 408 performs beamforming on an analog signal. To this end, the digital beamforming unit 404 multiplies beamforming weights to analog signals. The beamforming weights are used for changing the size and the phase of a signal. Specifically, according to a connection structure between the plurality of transmission paths 406-1 to 406-N and antennas, the analog beamforming unit 408 may be configured as illustrated in FIG. 4B or FIG. 4C.

Referring to FIG. 4B, signals input to the analog beamforming unit 408 undergo phase/size conversion and an operation of amplification, and are then transmitted through antennas. The signals in the paths are transmitted through different antenna sets, that is, antenna arrays. In relation to processing of a signal input through a first path, the signal is converted into a signal stream including signals having an identical phase or size or different phases or sizes by phase/size conversion units 412-1-1 to 412-1-M, the converted signals are amplified by amplifiers 414-1-1 to 414-1-M, and then the amplified signals are transmitted through antennas, respectively.

Referring to FIG. 4C, signals input to the analog beamforming unit 408 undergo phase/size conversion and an operation of amplification, and are then transmitted through antennas. The signals in the paths are transmitted through an identical antenna set, that is, an antenna array. In relation to processing of a signal input through a first path, the signal is converted into a signal stream including signals having an identical phase or size or different phases or sizes by phase/size conversion units 412-1-1 to 412-1-M, and the converted signals are amplified by amplifiers 414-1-1 to 414-1-M. In order to be transmitted through a single antenna array, amplified signals are added together based on antenna elements by adding units 416-1-1 to 416-1-M, and then the added signals are transmitted through the antennas, respectively.

FIG. 4B illustrates an example of using independent antenna arrays for transmission paths, and FIG. 4C illustrates an example of sharing a single antenna array between transmission paths. However, according to another embodiment, some transmission paths may use independent antenna arrays, and the remaining transmission paths may share a single antenna array. Further, according to yet another embodiment, a switchable structure between transmission paths and antenna arrays may be applied thereby allowing a structure which is changeable adaptively according to a situation.

In a long term evolution (LTE) system, a base station transmits a downlink control channel by using one to three orthogonal frequency division multiplexing (OFDM) symbols in one subframe. For the transmission, an omnidirectional antenna (omni antenna) is used and a cell-specific reference signal (CRS) is used as a reference signal. Meanwhile, in a new radio (NR) system, for compensation of path loss, it has been considered that after a beamforming technique is applied by using an array antenna, etc., a signal is transmitted and a demodulation RS (DMRS) is used as a reference signal. Signal transmission employing beamforming may have shortcomings, especially in a blockage situation. Therefore, in the disclosure, various embodiments for transmitting a downlink control channel (e.g. physical downlink control channel (PDCCH)) robustly against the blockage of a beam pair link (BPL) will be described later.

Figure 5:
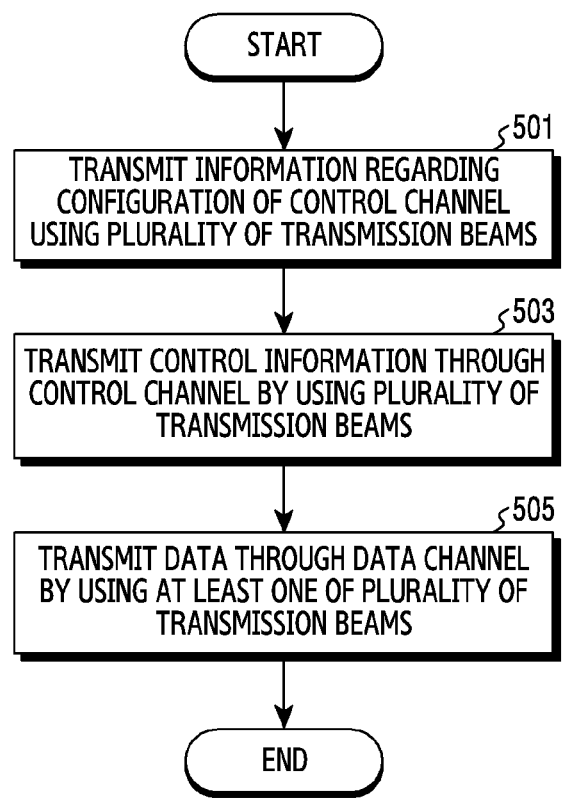
FIG. 5 illustrates a flow chart of a base station in a wireless communication system according to various embodiments of the disclosure.

FIG. 5 illustrates a flow chart of a base station in a wireless communication system according to various embodiments of the disclosure. FIG. 5 illustrates an example of an operation method of the base station 110.

Referring to FIG. 5, in operation 501, the base station transmits information regarding a configuration of a control channel using a plurality of transmission beams. The information regarding the configuration of the control channel may include at least one of information indicating whether the plurality of transmission beams are used, information regarding transmission patterns of control channels, information regarding beam allocation for each transmission instance of the control channel, information regarding at least one of a transmission beam for transmission of the control channels and a reception beam for reception of the control channels, information regarding resource allocation for the control channels, information regarding at least one of a transmission beam for transmission of another channel (e.g. data channel and uplink control channel) and a reception beam for reception of another channel, and information indicating whether pieces of control information included in the control channels transmitted by using the plurality of transmission beams are equal. The information regarding the configuration of the control channel may be transmitted by higher layer signaling (e.g. radio resource control (RRC) signaling, media access control (MAC) control element (CE), etc.), or may be included in information (e.g. downlink control information (DCI)) transmitted through the control channel.

In operation 503, the base station transmits control information through the control channel by using the plurality of transmission beams. That is, when the base station transmits the control information, the base station may perform transmission beamforming by using the plurality of transmission beams. The control information includes allocation information regarding a data channel. Control channels transmitted by using different beams may include pieces of control information having the same content or different contents. For example, first control information transmitted by using a primary beam and second control information transmitted by using a secondary beam allocate a resource at the same position or resources at different positions to corresponding data channels. If the control channels include pieces of control information having different contents, each of the pieces of control information may further include information regarding at least one of a transmission beam for transmission of a data channel and a reception beam for reception of the data channel.

In operation 505, the base station transmits data through the data channel by using at least one of the plurality of transmission beams. That is, when the base station transmits the data, the base station may perform transmission beamforming by using the plurality of transmission beams. The base station transmits the data channel by using the plurality of transmission beams used to transmit the control channel or beams having a QCL relationship with the transmission beams. Data channels transmitted by using different transmission beams may occupy the same resource or different resources.

Although not illustrated in FIG. 5, additionally, the base station may receive, through an uplink control channel, an acknowledgement (ACK)/negative ACK (NACK) relating to the data transmitted in operation 505. When the base station receives the ACK/NACK, the base station may perform reception beamforming by using at least one of reception beams. The reception beams may correspond to the transmission beams used to transmit the data channel. The base station may perform reception beamforming in one uplink control channel by using a plurality of reception beams, or may perform reception beamforming in multiple uplink control channels by using reception beams, respectively. In other words, an uplink control channel may be allocated to occupy the same resource regardless of transmission beams having been used to transmit a data channel received by a terminal, or occupy different resources according to the transmission beams.

Figure 6:
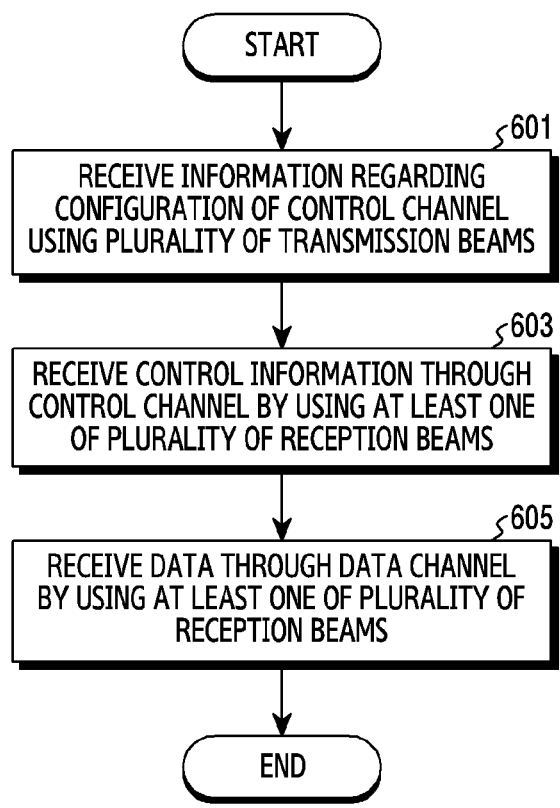
FIG. 6 illustrates a flow chart of a terminal in a wireless communication system according to various embodiments of the disclosure.

FIG. 6 illustrates a flow chart of a terminal in a wireless communication system according to various embodiments of the disclosure. FIG. 6 illustrates an example of an operation method of the terminal 120.

Referring to FIG. 6, in operation 601, the terminal receives information regarding a configuration of a control channel using a plurality of transmission beams. The information regarding the configuration of the control channel may include at least one of information indicating whether the plurality of transmission beams are used, information regarding transmission patterns of control channels, information regarding beam allocation for each transmission instance of the control channel, information regarding at least one of a transmission beam for transmission of the control channels and a reception beam for reception of the control channels, information regarding resource allocation for the control channels, information regarding at least one of a transmission beam for transmission of another channel (e.g. data channel and uplink control channel) and a reception beam for reception of another channel, and information indicating whether pieces of control information included in the control channels transmitted by using the plurality of transmission beams are equal. The information regarding the configuration of the control channel may be received by higher layer signaling (e.g. RRC signaling, MAC CE, etc.), or may be included in information (e.g. DCI) transmitted through the control channel.

In operation 603, the terminal receives control information through the control channel by using at least one of a plurality of reception beams. That is, when the terminal receives the control information, the terminal may perform reception beamforming by using at least one of a plurality of reception beams paired with a plurality of transmission beams used to transmit the control information by a base station. The control information includes allocation information regarding a data channel. Control channels which can be received by using reception beams may include pieces of control information having the same content or different contents. If the control channels include pieces of control information having the same content, the terminal may improve reception performance by combining the control channels. If the control channels include pieces of control information having different contents, each of the pieces of control information may further include information regarding at least one of a transmission beam for transmission of a data channel and a reception beam for reception of the data channel.

In operation 605, the terminal receives data through the data channel by using at least one of the plurality of reception beams. That is, when the terminal receives the data, the terminal may perform reception beamforming by using at least one of the plurality of reception beams. The terminal receives the data channel by using at least one of the plurality of reception beams used to receive the control channel or at least one of reception beams having a QCL relationship with the reception beams. Data channels which can be received by using different reception beams may occupy the same resource or different resources.

Although not illustrated in FIG. 6, additionally, the terminal may transmit, through an uplink control channel, an ACK/NACK relating to the data received in operation 605. When the terminal transmits the ACK/NACK, the terminal may perform transmission beamforming by using at least one transmission beam. The at least one transmission beam may correspond to at least one reception beam used to receive the data channel. The position of the uplink control channel for transmission of the ACK/NACK may be allocated regardless of used transmission beams or allocated differently according to used transmission beams. In other words, an uplink control channel may be allocated to occupy the same resource regardless of transmission beams having been used to transmit a data channel received by the terminal, or occupy different resources according to the transmission beams.

An aspect of a downlink control information transmitting technique according to various embodiments of the disclosure is to achieve robustness against a blockage situation by using multiple beams, and relates to the operations of: triggering a multi-beam transmission mode from a single beam transmission mode; configuring and signaling pieces of information required for transmitting a downlink control channel by using multiple beams; and detecting and reporting beam failure by using the multiple beams.

Before explanation of concrete embodiments, the disclosure includes a description relating to a procedure of discovering and configuring a beam usable for transmitting or receiving a signal between a base station and a terminal at the time of initial access. The discovering of the beam includes finding and determining information regarding a beam usable for transmission or reception of a signal by the terminal or the base station. The discovering of the beam may be called "beam management". The configuring of the beam includes exchanging the discovered beam information between the base station and the terminal and sharing information regarding a beam to be used for transmission or reception after the exchanging. The indication of a BPL for transmission of a signal through a downlink control channel between the base station and the terminal may be performed as described below. An Indication of a channel state information (CSI)-RS resource index having a QCL relationship with the downlink control channel may be called "BPL indication". That is, a BPL may be indicated by using a resource.

1) The base station indicates, through a MAC CE and to the terminal, a resource, among activated CSI-RS resources, which has a QCL relationship with a PDCCH.

2) The terminal receives the CSI-RS resource and measures the quality of a CSI-RS, and then selects an optimal CSI-RS reception beam, based on information regarding the measurement of the CSI-RS.

3) The terminal may use a beam having a QCL relationship with an optimal terminal reception beam to receive the PDCCH.

According to another embodiment, the terminal may select N number of CSI-RS resources and report terminal beam set index information to the base station. The base station assumes that the terminal can receive, by using the same terminal beam, K number of beams, among N number of base station beams, reported as having the same terminal beam set index. The base station having received a beam measurement (BM) report including a terminal beam set index may simultaneously use beams corresponding to base station beam identifiers (IDs) having the same set index to transmit or receive a signal with the terminal. In addition, without previously notifying the terminal, the base station may alternately use base station beams corresponding to base station beam IDs having the same set index to transmit or receive a signal with the terminal. Hereinafter, in various embodiments, transmission using multiple BPLs having different terminal beam indices rather than the same terminal beam set index will be assumed.

Figure 7:
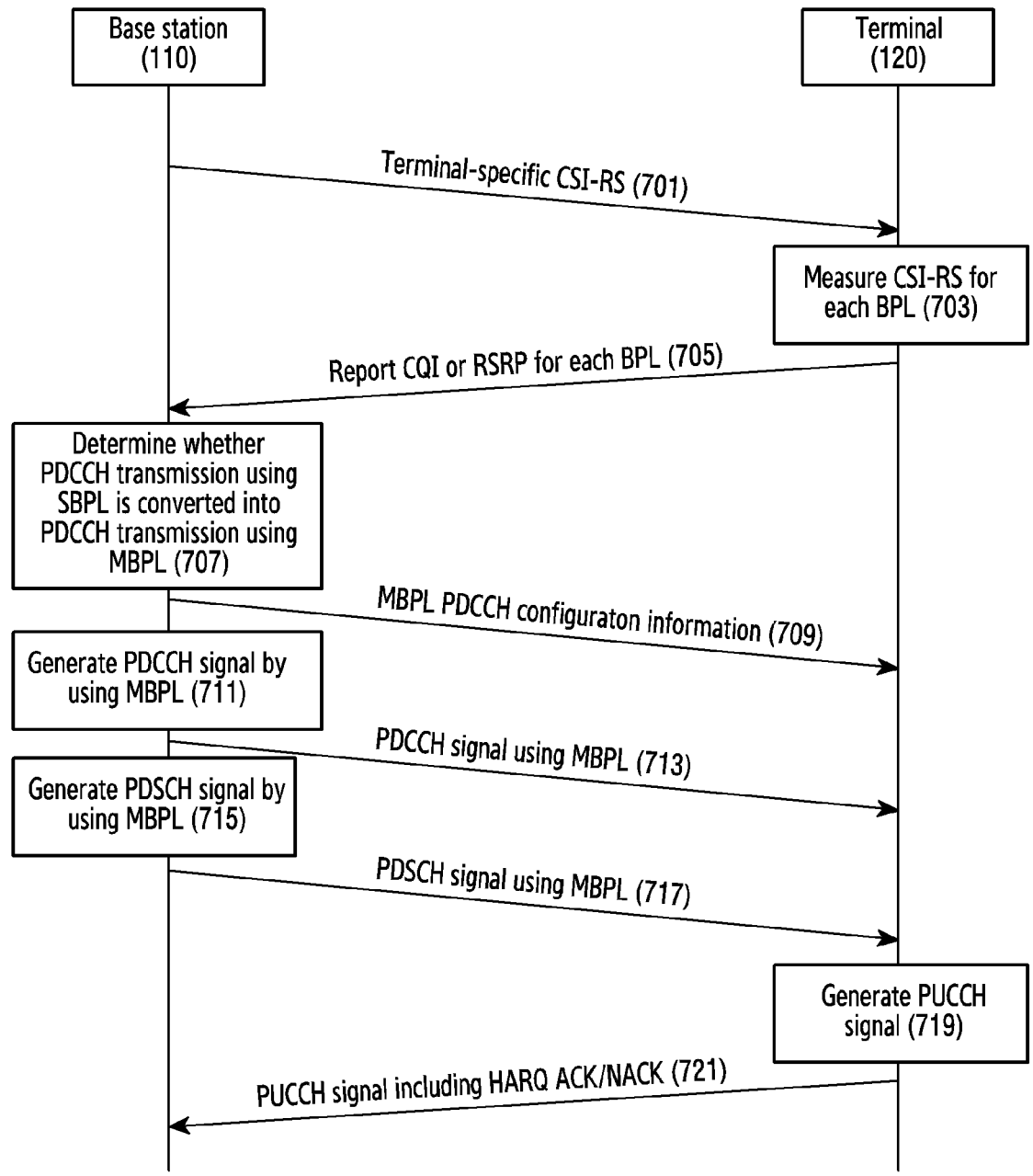
FIG. 7 illustrates a signal exchange between a base station and a terminal in a wireless communication system according to various embodiments of the disclosure.

Overall operations and signaling between a base station and a terminal, considered in the disclosure, are illustrated in FIG. 7. FIG. 7 illustrates a signal exchange between a base station and a terminal in a wireless communication system according to various embodiments of the disclosure.

Referring to FIG. 7, in operation 701, the base station 110 allocates and transmits a terminal-specific CSI-RS to the terminal 120. In operation 703, the terminal 120 measures a CSI-RS for each BPL. In operation 705, the terminal 120 reports BPL-related information such as channel quality information (CQI) or RS received power (RSRP) for each BPL. In operation 707, the base station 110 may determine, by using the reported information, whether a mode is converted from a mode of PDCCH transmission using a single beam pair link (SBPL) into a mode of PDCCH transmission using a multi-beam pair link (MBPL). For example, the base station 110 may calculate metrics as exemplified below, and determine the conversion from the SBPL mode to the MBPL mode, based on the calculated metrics. The metrics below correspond to examples, and various other metrics may be utilized.

1) The index of an optimal beam (best beam) reported by the terminal are frequently changed 2) The result of beam measurement by the terminal indicates that a difference in power between an optimal beam and a second optimal beam is equal to or smaller than a threshold value After the change to the MBPL mode, in operation 709, the base station 110 transmits MBPL PDCCH configuration information to the terminal 120 so that the terminal successfully receives a PDCCH transmitted by using the MBPL. In operation 711, the base station 110 generates a PDCCH signal by using the MBPL. In operation 713, the terminal 120 receives, based on the received configuration information, the PDCCH signal transmitted by using the MBPL. In operation 715, the base station 110 generates a PDSCH signal by using the MBPL. In operation 717, the terminal 120 receives the PDSCH signal by using the received PDCCH. In operation 719, the terminal 120 generates a PUCCH signal including feedback information regarding a corresponding PDSCH. In operation 721, the terminal 120 transmits a hybrid automatic repeat request (HARQ) ACK/NACK relating to whether the PDSCH is received, through a corresponding PUCCH to the base station 110.

Figure 8:
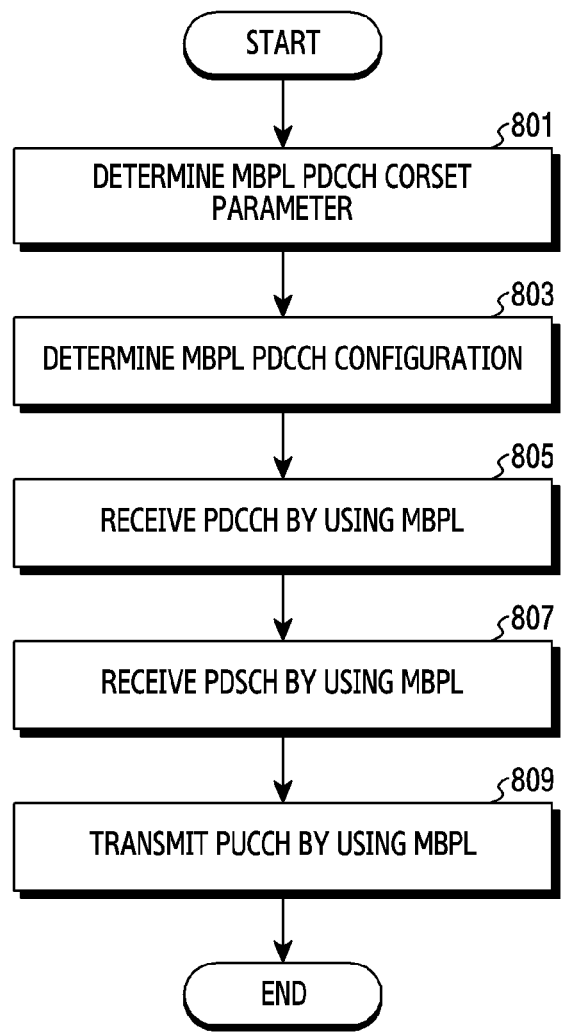
FIG. 8 illustrates a flowchart for performing communication by using a plurality of beams in a wireless communication system according to various embodiments of the disclosure.

FIG. 8 illustrates a flowchart for performing communication by using a plurality of beams in a wireless communication system according to various embodiments of the disclosure. FIG. 8 illustrates an example of operation methods of the base station 110 and the terminal 120.

Referring to FIG. 8, in operation 801, the base station firstly determines a MBPL PDCCH configuration parameter allowing the terminal to successfully receive a MBPL PDCCH if the PDCCH is transferred to the terminal. For example, a parameter of a control resource set (CORESET) is an example of a parameter of which the base station should notify the terminal. The CORESET parameter corresponds to information regarding a resource for reception of the PDCCH and may include parameters such as a symbol index, a resource block (RB) index, search space information, and an aggregation level. If an MBPL operation is used, CORESET information may be transferred according to embodiments as below. In the following embodiments, information regarding a BPL will be explained as being indicated separately from the CORESET information. However, depending on the definition of the CORESET information, beam-related information may be included in the CORESET information and may be indicated separately from the CORESET information. In operation 803, the base station determines a MBPL PDCCH configuration. In operation 805, the terminal receives the PDCCH by using a corresponding MBPL. In operation 807, the terminal receives a PDSCH by using the MBPL. In operation 809, the terminal transmits a PUCCH by using the MBPL.

Figure 9A:
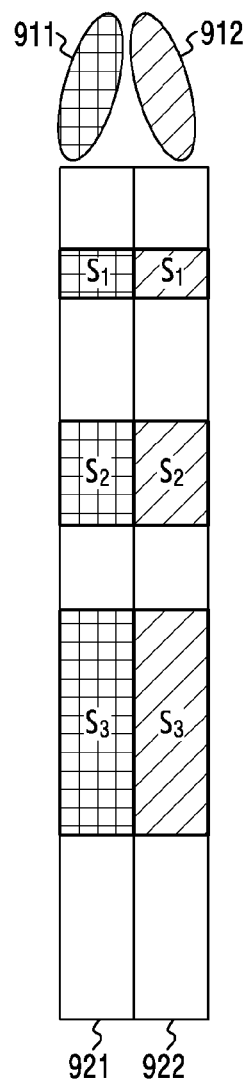
FIGS. 9A to 9C illustrate examples of a control resource set (CORESET) configuration in a wireless communication system according to various embodiments of the disclosure.
Figure 9B:
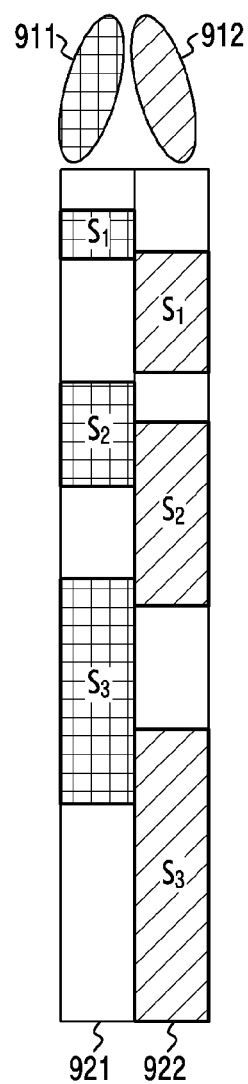
Figure 9C:
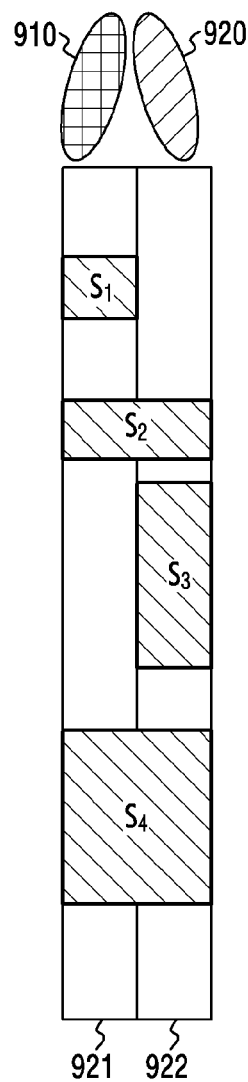

Hereinafter, the embodiments relating to a CORESET will be explained with reference to FIGS. 9A to 9C. FIGS. 9A to 9C illustrate examples of a CORESET configuration in a wireless communication system according to various embodiments of the disclosure. FIG. 9A illustrates a case where pieces of CORESET information for BPLs are the same, FIG. 9B illustrates a case where pieces of CORESET information for BPLs are different from each other, and FIG. 9C illustrates a case of providing one piece of CORESET information to BPLs.

Referring to FIG. 9A, CORESET information is allocated to a primary BPL. However, CORESET information for a secondary BPL is not allocated. Accordingly, the terminal uses, for the secondary BPL, a CORESET parameter of the primary BPL. Consequently, PDCCHs in a first domain 921, transmitted by using a primary transmission beam 911 and PDCCHs in a second domain 922, transmitted by using a secondary transmission beam 912 have the same configuration, except having the same symbol index. That is, the CORESET information of the primary BPL is identical to CORESET information corresponding to the secondary BPL. Therefore, as exemplified in FIG. 9A, three search spaces $S_1$, $S_2$, and $S_3$ for each CORESET may be configured to be at the same RB positions.

Referring to FIG. 9B, CORESET information is independently allocated to each of BPLs. CORESET information of a secondary BPL is additionally allocated separately from a CORESET of a primary BPL. Consequently, PDCCHs in a first domain 921, transmitted by using a primary transmission beam 911 and PDCCHs in a second domain 922, transmitted by using a secondary transmission beam 912 may have different configurations. That is, unlike the example illustrated in FIG. 9A, the pieces of CORESET information of the BPLs are different. As exemplified in FIG. 9B, three search spaces $S_1$, $S_2$, and $S_3$ for each BPL may exist, but RB indices, RB sizes, aggregation levels of the search spaces may be different according to the corresponding BPLs.

Referring to FIG. 9C, one piece of CORESET information is allocated to multiple BPLs. The type of CORESET information illustrated in FIG. 9C may be same as that of the example illustrated in FIG. 9B. In the case as illustrated in FIG. 9C, a search space may be received through multiple symbols received by multiple BPLs. As illustrated in FIG. 9C, if there are four search spaces $S_1$, $S_2$, $S_3$, and $S_4$, a search space may occupy two symbols (e.g. $S_2$ and $S_4$). For an additional example, if four RBs are used, three resource element groups (REGs) among four REGs may be mapped to a first symbol received by a primary beam, and the remaining one REG may be mapped to a second symbol received by a secondary beam.

In the embodiments illustrated in FIGS. 9A to 9C, the first domain 921 and the second domain 922 are illustrated to have the same time axis length. However, according to another embodiment, the first domain 921 and the second domain 922 may have different time axis lengths. For example, the time axis lengths of the first domain 921 and the second domain 922 may be different according to the characteristics of used transmission beams.

Also, in addition to CORESET information, information regarding a symbol index required to be applied for each BPL and the index of a terminal reception beam for each BPL, used for reception, is required to be signaled. For example, information regarding a terminal reception beam index and a symbol index may be included in CORESET information.

Information regarding a symbol index applying a terminal reception beam is described below. A symbol index according to a terminal reception beam is associated with a monitoring interval of the terminal. The monitoring interval may have a beam-specific particular period when the base station operates in an MBPL mode, and may be determined according to the period. By signaling of information regarding the monitoring interval, the terminal may identify a symbol, through which PDCCHs corresponding to a primary BPL and a secondary BPL are transmitted, and a time position, at which the PDCCHs are transmitted. The embodiments relating to the monitoring interval are described with reference to FIGS. 10A to 10C.

Figure 10A:
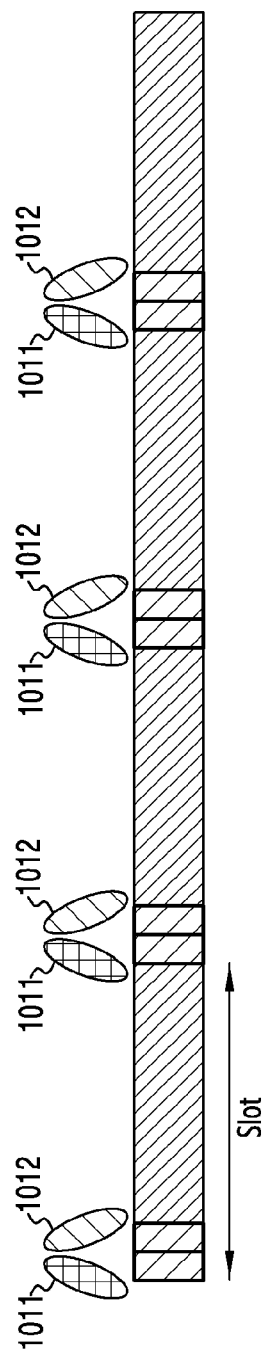
Figure 10C:
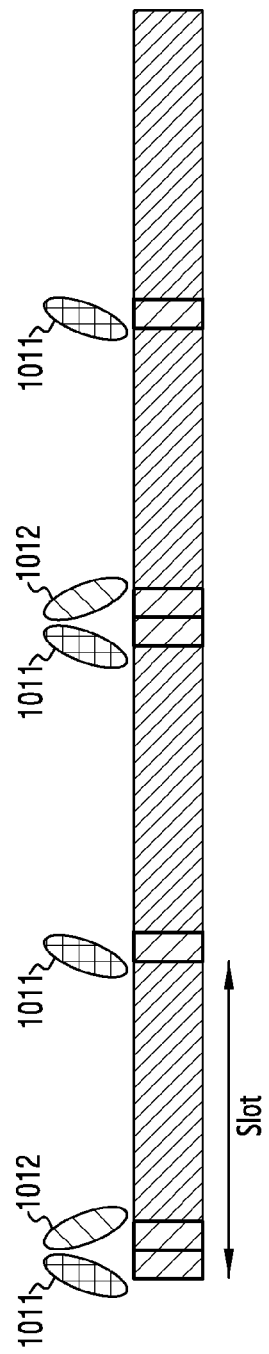

FIGS. 10A to 10C illustrate examples of a monitoring interval of a downlink control channel in a wireless communication system according to various embodiments of the disclosure. FIG. 10A illustrates a case where multiple beams are used in each slot, FIG. 10B illustrates a case where a single beam is used in each slot and different beams are used in slots, respectively, and FIG. 10C illustrates a case where a beam is used in each slot, and another beam is selectively used.

Referring to FIG. 10A, multiple beams are used in a slot. Specifically, a primary beam 1011 and a secondary beam 1012 are used in each of slots to transmit a PDCCH. Referring to FIG. 10B, a PDCCH is transmitted in one slot by using one beam, and beams for PDCCH transmission are different according to slots. Specifically, one beam among the primary beam 1011 or the secondary beam 1012 is used in each slot to transmit a PDCCH. Referring to FIG. 10C, a primary beam is used in each slot, and a use period of a secondary beam is configured to be sparse. Specifically, the primary beam 1011 is used in each slot, and the secondary beam 1012 is used once every two slots. The example illustrated in FIG. 10C may be understood as a subset of the example illustrated in FIG. 10A.

In the embodiments illustrated in FIGS. 10A to 10C, a transmission period of a PDCCH is illustrated as a slot. However, according to another embodiment, a transmission period of a PDCCH may be defined by another unit resource (e.g. subframe, etc.).

An information set $(m_1, m_2, m_3)$ may be configured as shown in <Table 1> in order to distinguish between the schemes as illustrated in FIGS. 10A, 10B, and 10C.

TABLE 1

| Parameter | Contents | Description |
| --- | --- | --- |
| $m_1$ | Use period of secondary beam | |
| $m_2$ | Position at which secondary beam starts to be used | |
| $m_3$ | Whether primary beam is used together at position at which secondary beam is used | 0: Primary beam is also used at position at which secondary beam is used<br>1: Primary beam is not used at position at which secondary beam is used (reception is performed at position of primary beam by using secondary beam) |

If the index of a first slot is 0, $(m_1, m_2, m_3)$ in the embodiment illustrated in FIG. 10A is (1,0,0), $(m_1, m_2, m_3)$ in the embodiment illustrated in FIG. 10B is (2,1,1), and $(m_1, m_2, m_3)$ in the embodiment illustrated in FIG. 10C is (2,0,1).

Hereinafter, information regarding a beam index of a terminal will be described. Information of the index of a terminal beam to be used by the terminal may be configured as shown in <Table 2>, <Table 3>, or <Table 4>.

TABLE 2

| Primary beam index set = $\{B_{PDCCH\_P}, B_{PDSCH\_P}, B_{PUCCH\_P}\}$<br>Secondary beam index set = $\{B_{PDCCH\_S}, B_{PDSCH\_S}, B_{PUCCH\_S}\}$ |
| --- |

TABLE 3

| Control channel beam index set = $\{B_{PDCCH\_P}, B_{PDCCH\_S}\}$<br>Data channel beam index set = $\{B_{PDSCH\_P}, B_{PDSCH\_S}\}$<br>UL control channel beam index set = $\{B_{PUCCH\_P}, B_{PUCCH\_S}\}$ |
| --- |

TABLE 4

| Control channel beam index set = $\{B_{PDCCH\_P}, B_{PDCCH\_S}\}$<br>Primary beam index set = $\{B_{PDSCH\_P}, B_{PUCCH\_P}\}$<br>Secondary beam index set = $\{B_{PUSCH\_P}, B_{PUCCH\_S}\}$ |
| --- |

In <Table 2>, <Table 3>, and <Table 4>, $B_{PDCCH\_P}$ indicates the index of a beam for a PDCCH, corresponding to a primary BPL, $B_{PDSCH\_P}$ indicates the index of a beam for a PDSCH, corresponding to the primary BPL, $B_{PUCCH\_P}$ indicates the index of a beam for a PUCCH, corresponding to the primary BPL, $B_{PDCCH\_S}$ indicates the index of a beam for a PDCCH, corresponding to a secondary BPL, $B_{PDSCH\_S}$ indicates the index of a beam for a PDSCH, corresponding to the secondary BPL, and $B_{PUCCH\_S}$ indicates the index of a beam for a PUCCH, corresponding to the secondary BPL. As described above, beams used in each channel may be defined to be beam index sets for the primary BPL and the secondary BPL and then be used.

According to an embodiment, all pieces of information regarding beam indices may be signaled through a RRC or a media access control (MAC) control element (CE). According to an embodiment, beam information regarding a PDSCH may be included in DCI in addition to RRC signaling and MAC CE signaling. According to an embodiment, beam information regarding a PUCCH may be included in a DCI content or a PDSCH content, in addition to RRC signaling and MAC CE signaling.

According to another embodiment, for a PDSCH and a PUCCH, a particular single BPL may be used regardless of a PDCCH BPL. In this case, BPDSCH_P and BPDSCH_S are identical, BPUCCH_P and BPUCCH_S are identical, and a primary beam and a secondary beam are not required to be distinguished from each other.

Figure 11A:
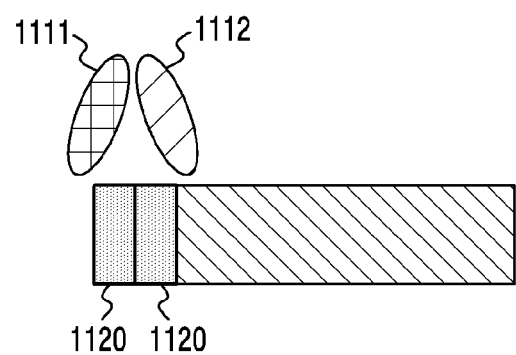
FIGS. 11A to 11C illustrate examples of resource patterns of downlink control channels in a wireless communication system according to various embodiments of the disclosure.
Figure 11B:
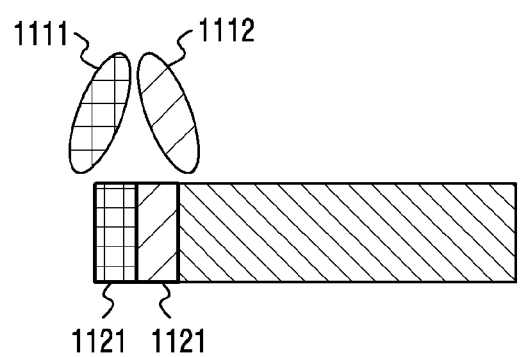
Figure 11C:
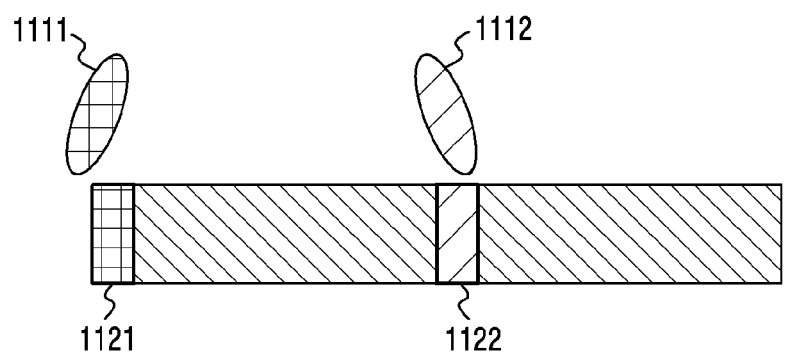

Hereinafter, a procedure of indicating a beam index associated with allocation of a resource for transmission of a PDSCH and a PUCCH will be described with reference to FIGS. 11A to 11C. FIGS. 11A to 11C illustrate examples of resource patterns of downlink control channels in a wireless communication system according to various embodiments of the disclosure. FIGS. 11A to 11C illustrate a method of allocating a PDCCH in MBPL transmission.

Referring to FIG. 11A, pieces of DCI information of PDCCHs with respect to two BPLs are identical. That is, PDCCHs transmitted by using a primary beam 1111 and a secondary beam 1112 may include the same control information 1120. In this case, parts of DCI contents, relating to RB allocation (assignment) for a PDSCH, are identical. Therefore, the base station transmits the PDSCH through a resource located at the same position by using multiple beams. The terminal decodes the PDSCH by using a PDSCH beam paired with a beam having succeeded to perform decoding, among multiple beams having been used to receive the PDCCHs.

Referring to FIG. 11B, pieces of DCI information of PDCCHs with respect to two BPLs may be different. Specifically, a PDCCH transmitted by using the primary beam 1111 may include control information 1121, and a PDCCH transmitted by using the secondary beam 1112 may include control information 1121. In this case, parts of DCI contents, relating to RB allocation for a PDSCH, may be different, and the base station may include, in each of the DCI contents, information of the index of a reception beam for a PDSCH.

Referring to FIG. 11C, one PDCCH exists in each slot, and thus DCI contents may be different according to BPLs. Specifically, the primary beam 1111 may be used in a first slot and a PDCCH in the first slot may include control information 1121, and the secondary beam 1112 may be used in a second slot, and a PDCCH in a second slot may include control information 1122. In this case, similarly to the example illustrated in FIG. 11B, the base station may include, in each of the DCI contents, information of the index of a reception beam for a PDSCH.

In the examples illustrated in FIGS. 11B and 11C, if beam index sets as shown in <Table 4> are used, a "primary beam index set" and a "secondary beam index set" may be signaled after being included in DCI contents of PDCCHs transmitted by beams indicated by BPDCCH_P and BPDCCH_S, respectively.

Figure 12A:
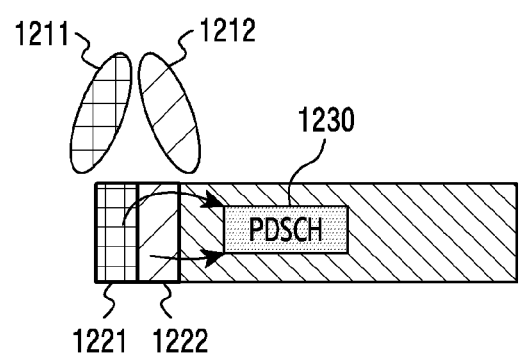
FIGS. 12A to 12C illustrate examples of resource patterns of downlink data channels in a wireless communication system according to various embodiments of the disclosure.
Figure 12B:
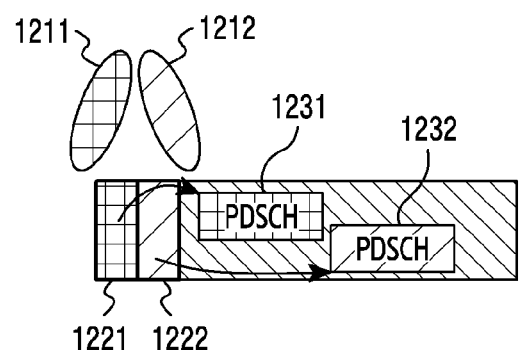
Figure 12C:
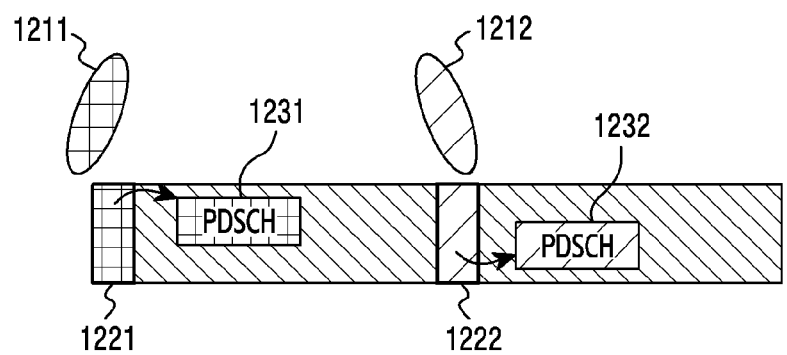

Hereinafter, the allocation of resources for a PDSCH will be described with reference to FIGS. 12A to 12C. FIGS. 12A to 12C illustrate examples of resource patterns of downlink data channels in a wireless communication system according to various embodiments of the disclosure. The base station does not identify a BPL by which the terminal has succeeded to receive a PDCCH. Therefore, the base station transmits a PDSCH by using all BPLs for PDSCHs.

Referring to FIG. 12A, one PDSCH is transmitted in one resource by using both two beams. Specifically, control information 1221 transmitted by using a primary beam 1211 and control information 1222 transmitted by using a secondary beam 1212 may indicate an identical PDSCH 1230. Contents included in the control information 1221 and the control information 1222 may be identical or different from each other.

Referring to FIG. 12B, different PDSCHs are transmitted in one slot by using both two beams. Control information 1221 transmitted by using a primary beam 1211 may indicate a first PDSCH 1231 and control information 1222 transmitted by using a secondary beam 1212 may indicate a second PDSCH 1232.

Referring to FIG. 12C, PDCCHs are transmitted in different slots by using different beams, respectively, and different PDSCHs are transmitted by using the different beams. Specifically, control information 1221 and a first PDSCH 1231 may be transmitted in a first slot by using a primary beam 1211, and control information 1222 and a second PDSCH 1232 may be transmitted in a second slot by using a secondary beam 1212.

Similarly to a PDCCH, the base station does not identify a BPL by which the terminal has received a PDSCH. Therefore, the base station does not identify a BPL by which the terminal will report a HARQ ACK/NACK relating to the PDSCH. Therefore, the base station receives a PUCCH by using all BPLs for PUCCHs. The embodiments further considering the allocation of resources for PUCCHs in addition to the allocation of resources for PDSCHs will be described with reference to FIGS. 13A to 13E. FIGS. 13A to 13E illustrate examples of resource patterns of uplink control channels in a wireless communication system according to various embodiments of the disclosure.

Figure 13A:
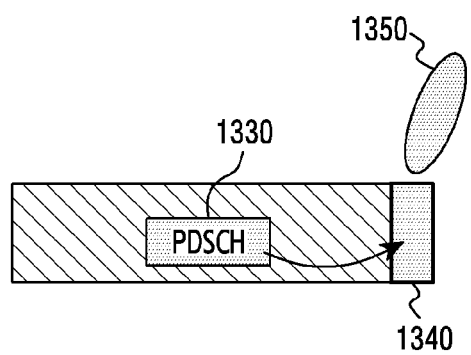
FIGS. 13A to 13E illustrate examples of resource patterns of uplink control channels in a wireless communication system according to various embodiments of the disclosure.

Referring to FIG. 13A, PDSCHs including the same content are transmitted in the same resource by using multiple beams, and resources to be used for reporting PDSCH HARQ ACK/NACKs through BPLs, respectively, are also identical. Specifically, a PDSCH 1330 may be transmitted through the same resource by using multiple beams and an ACK/NACK relating to the PDSCH 1330 may be transmitted on a PUCCH 1340 through a beam 1350 corresponding to a beam having been used to receive the PDSCH 1330.

Figure 13B:
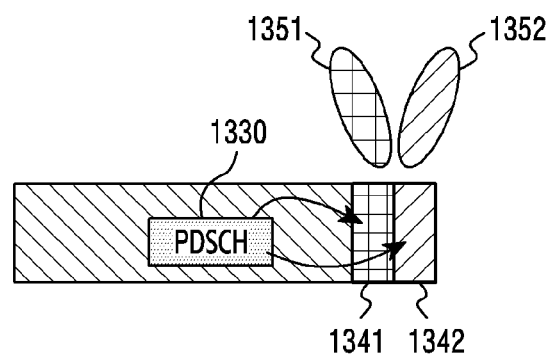

Referring to FIG. 13B, PDSCHs including the same content are transmitted in the same resource by using multiple beams, and PDSCH HARQ ACKs/NACKs for BPLs are reported through different PUCCH resources. Specifically, a PDSCH 1330 is transmitted through the same resource by using multiple beams. An ACK/NACK relating to the PDSCH 1330 may be transmitted on a first PUCCH 1341 by using a beam 1351 or may be transmitted on a second PUCCH 1342 by using a beam 1352. According to another embodiment, the ACK/NACK may be repeatedly transmitted on both the first PUCCH 1341 and the second PUCCH 1342.

Figure 13C:
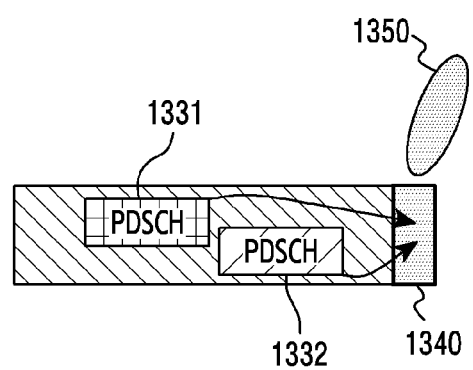

Referring to FIG. 13C, PDSCHs including different contents are transmitted through different resources in the same slot by using multiple beams, and resources through which PDSCH HARQ ACKs/NACKs for BPLs are reported are identical. Specifically, a first PDSCH 1331 and a second PDSCH 1332 are transmitted through different resources by using different beams, respectively. The terminal may receive one of the first PDSCH 1331 and the second PDSCH 1332 and transmit an ACK/NACK through a PUCCH 1340 by using a beam 1350 corresponding to the received PDSCH.

Figure 13D:
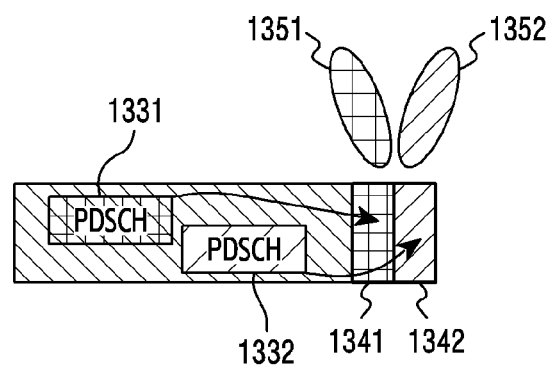

Referring to FIG. 13D, PDSCHs including the same content are transmitted through different resources in the same slot by using multiple beams, and PUCCH resources through which PDSCH HARQ ACKs/NACKs for BPLs are to be reported are different from each other. Specifically, a first PDSCH 1331 and a second PDSCH 1332 are transmitted through different resources by using different beams, respectively. If the first PDSCH 1331 is received, an ACK/NACK may be transmitted on a first PUCCH 1341 by using a beam 1351. If the second PDSCH 1332 is received, an ACK/NACK may be transmitted on a second PUCCH 1342 by using a beam 1352.

Figure 13E:
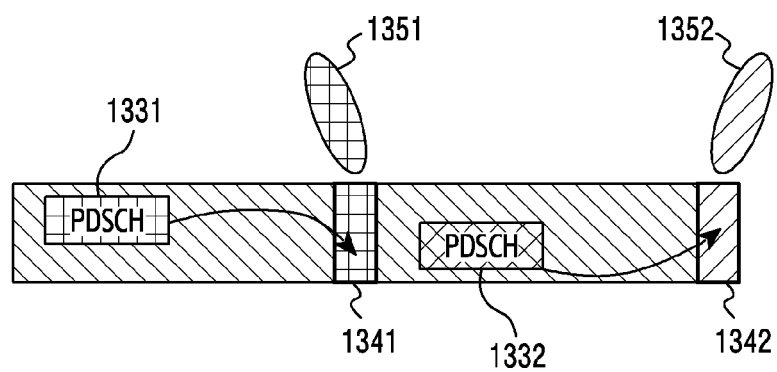

Referring to FIG. 13E, PDSCHs including the same content are transmitted through different resources in different slots by using multiple beams, and PUCCH resources through which PDSCH HARQ ACKs/NACKs for BPLs are to be reported are allocated to the different slots. Specifically, in a first slot, a first PDSCH 1331 is transmitted, and in a second slot, a second PDSCH 1332 is transmitted. Accordingly, the terminal may receive the first PDSCH 1331 in the first slot and transmit an ACK/NACK on a first PUCCH 1341 by using a beam 1351. The terminal may receive the second PDSCH 1332 in the second slot and transmit an ACK/NACK on a second PUCCH 1342 by using a beam 1352.

In the described embodiments, if DCI contents of PDCCHs for BPLs are different, a PDSCH reception beam can be indicated through DCI. In this regard, if PDSCHs are different, information of a beam which the terminal is to use for a PUCCH can be indicated to the terminal after being included in the PDSCHs.

The transmission or reception of a signal between the terminal and the base station may be performed according to various combinations of the illustrated embodiments for PDCCHs, PDSCHs, and PUCCHs. For example, communication may be performed according to the embodiments illustrated in FIGS. 11B, 12A, and 13A. In consideration of the efficient use of resources, a method of allocating a PDSCH and a PUCCH to the same resource for each BPL, as illustrated in FIG. 13A, may be preferred. In this case, information of a beam to be used for a PDSCH and a PUCCH paired with a PDCCH for each BPL may be included in DCI and may be previously indicated through information such as a beam index set by RRC signaling or a MAC CE.

In addition to the illustrated signaling embodiments and resource allocation embodiments, according to another embodiment, the terminal may report, together with reporting a PDSCH ACK/NACK whether the terminal has succeeded to receive a PDCCH for each BPL through a PUCCH resource for reporting the PDSCH ACK/NACK. In this case, the base station may explicitly identify a BPL, among a primary BPL and a secondary BPL, by which the terminal has received a PDCCH and a PDSCH and has transmitted a PUCCH. If the primary BPL among the primary BPL and the secondary BPL has failed to receive the PDCCH, the base station may perform a procedure for determining a new primary BPL. On the contrary, if the secondary BPL has failed to receive the PDCCH, the base station may perform a procedure for determining a new secondary BPL. If all the two BPLs have failed to receive the PDCCH, the transmission of a PDSCH ACK/NACK as well as a PDCCH ACK/NACK may be difficult. As a method of explicitly transferring information, a two-bit bitmap may be used. A first bit of the bitmap may be used to indicate an ACK/NACK relating to the PDCCH transmitted by using the primary BPL, and a second bit of the bitmap may be used to indicate an ACK/NACK relating to the PDCCH transmitted by using the secondary BPL.

In an embodiment of transmitting PDSCHs through the same resource, the terminal may succeed in receiving a PDCCH by both a primary BPL and a secondary BPL. In this case, the terminal may select one of the two BPLs and receive a PDSCH by using a PDSCH beam of a selected BPL. The selection of beams for PDSCHs may be variously performed. The embodiments below correspond to examples, various other methods may exist, and the disclosure is not limited to the embodiments below.

According to an embodiment, the terminal always receives a PDSCH by using a PDSCH beam of a primary BPL by default. According to another embodiment, the terminal may calculate a particular metric in a procedure of decoding a PDCCH by each BPL, compare metrics, and receive a PDSCH by using a PDSCH beam corresponding to a BPL having higher reliability. For example, the metric may be based on at least one of the magnitude of a RSRP of a DMRS of each BPL, the magnitude of an absolute value of a log likelihood ratio (LLR) of a reception signal of each BPL, and a difference in Euclidean distance between a LLR of a reception signal and a LLR of a transmission signal in a code domain according to a decoding result.

In an embodiment of always using a PDSCH beam of a primary BPL, the terminal may not include, in a PUCCH content, ACK/NACK information regarding a PDCCH of each BPL, and implicitly report a PDCCH ACK/NACK relating to a BPL of a primary beam through a PUCCH beam. If the terminal transmits a PUCCH through a PUCCH beam corresponding to a secondary BPL, the base station may determine that the terminal has failed to decode PDCCH information of the primary BPL. According to another embodiment, on the contrary, if the secondary BPL is always used, the terminal may implicitly notify, by using a PUCCH transmission beam, the base station of an ACK/NACK relating to PDCCH information transmitted by the secondary BPL.

In the illustrated various embodiments, a beam index is used as information for specifying a beam. However, according to another embodiment, a resource index may be used as information for specifying a beam. Specifically, if reference signals beamformed by different beams are transmitted in a procedure of determining a preferred beam, the indices of resources (e.g. symbols) occupied by the reference signals may be used to specify the beams. '$B_{PDCCH\_P}$' may not mean the index of a beam, and may be defined as the index of a reference signal resource having a QCL relationship with a control channel transmitted by using a primary beam.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within an electronic device. The at least one program may include instructions that cause the electronic device to perform the methods according to embodiments disclosed herein or the appended claims of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, the programs may be stored in a memory configured by a combination of some or all the memory devices described above. Further, a plurality of such configured memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device performing an embodiment of the disclosure via an external port. Further, a separate storage device on the communication network may access a device performing an embodiment of the disclosure.

In the above-described concrete embodiments of the disclosure, an element included in the disclosure is expressed in the singular or the plural according to a presented concrete embodiment. However, the singular form or plural form is selected for convenience of description to be suitable for the presented situation, and the disclosure are not limited to a single element or multiple elements thereof. Further, either multiple elements expressed in the description may be configured into a single element or a single element in the description may be configured into multiple elements.

While the detailed description of the disclosure has been shown with reference to concrete embodiments thereof, it will be understood that various changes can be made therein without departing from the scope of the disclosure. Therefore, the scope of the disclosure should not be defined as being limited to the illustrated embodiments, but should be defined by the appended claims and equivalents thereof.

The invention claimed is:

1. A method performed by a base station (BS) in a wireless communication system, the method comprising:
   transmitting, to a terminal, configuration information via a radio resource control (RRC), wherein the configuration information includes:
   information on a primary beam pair link (BPL) for resources of a first control resource set (CORESET) associated with a first physical downlink control channel (PDCCH); and
   information on a secondary BPL for resources of a second CORESET associated with a second PDCCH;

transmitting first control information based on the information on the primary BPL;
transmitting second control information based on the information on the secondary BPL;
transmitting first data allocated by the first control information and transmitting second data allocated by the second control information; and
receiving feedback information in a slot through a physical uplink control channel (PUCCH), the feedback information including hybrid automatic repeat request (HARQ) acknowledgement (ACK)/negative ACK (NACK) information associated with the first data and HARQ ACK/NACK information associated with the second data,
wherein information of the first CORESET associated with the primary BPL is separately allocated from information of the second CORESET associated with the second BPL, and
wherein resources of the first data and resources of the second data are overlapped in a time domain.

2. The method of claim 1,
wherein the first data comprises a first physical downlink shared channel (PDSCH) and the second data comprises a second PDSCH,
wherein the first PDSCH is associated with a third reference signal resource for a quasi co-located (QCL) relationship, the third reference signal resource indicated by the first control information, and
wherein the second PDSCH is associated with a fourth reference signal resource for a QCL relationship, the fourth reference signal resource indicated by the second control information.

3. The method of claim 2,
wherein the third reference signal resource is one of a set of reference signal resources indicated by a medium access control (MAC) control element (CE) associated with the primary BPL information, and
wherein the fourth reference signal resource is one of a set of reference signal resources indicated by a MAC CE associated with the secondary BPL information.

4. The method of claim 1, wherein the PUCCH is associated with a reference signal resource for a QCL relationship, indicated by an RRC signaling or a medium access control (MAC) control element (CE).

5. A method performed by a terminal in a wireless communication system, the method comprising:
receiving configuration information via a radio resource control (RRC) signaling, wherein the configuration information includes:
information on a primary beam pair link (BPL) for resources of a first control resource set (CORESET) associated with a first physical downlink control channel (PDCCH); and
information on a secondary BPL for resources of a second CORESET associated with a second PDCCH;
receiving first control information based on the information on the primary BPL;
receiving second control information based on the information on the secondary BPL;
receiving first data allocated by the first control information and receiving second data allocated by the second control information; and
transmitting feedback information in a slot through a physical uplink control channel (PUCCH), the feedback information including hybrid automatic repeat request (HARQ) acknowledgement (ACK)/negative ACK (NACK) information associated with the first data and HARQ ACK/NACK information associated with the second data,
wherein information of the first CORESET associated with the primary BPL is seperately allocated from information of the second CORESET associated with the second BPL, and
wherein resources of the first data and resources of the second data are overlapped in a time domain.

6. The method of claim 5,
wherein the first data comprises a first physical downlink shared channel (PDSCH) and the second data comprises a second PDSCH,
wherein the first PDSCH is associated with a third reference signal resource for a quasi co-located (QCL) relationship, the third reference signal resource indicated by the first control information, and
wherein the second PDSCH is associated with a fourth reference signal resource for a QCL relationship, the fourth reference signal resource indicated by the second control information.

7. The method of claim 6,
wherein the third reference signal resource is one of a set of reference signal resources indicated by a medium access control (MAC) control element (CE) associated with the primary BPL information, and
wherein the fourth reference signal resource is one of a set of reference signal resources indicated by a MAC CE associated with the secondary BPL information.

8. The method of claim 5, wherein the PUCCH is associated with a reference signal resource for a QCL relationship, indicated by an RRC signaling or a medium access control (MAC) control element (CE).

9. A terminal in a wireless communication system, the terminal comprising:
at least one processor; and
at least one transceiver coupled to the at least one processor,
wherein the at least one processor is configured to:
receive configuration information via a radio resource control (RRC) signaling, wherein the configuration information includes:
information on a primary beam pair link (BPL) for resources of a first control resource set (CORESET) associated with a first physical downlink control channel (PDCCH); and
information on a secondary BPL for resources of a second CORESET associated with a second PDCCH;
receive first control information based on the information on the primary BPL;
receive second control information based on the information on the secondary BPL;
receive first data allocated by the first control information and receiving second data allocated by the second control information, wherein resources of the first data and resources of the second data are in a same time interval; and
transmit feedback information in a slot through a physical uplink control channel, PUCCH, the feedback information including hybrid automatic repeat request (HARQ) acknowledgement (ACK)/negative ACK (NACK), information associated with the first data and HARQ ACK/NACK information associated with the second data, wherein information of the first CORESET associated with the primary BPL is separately allocated from information of the second CORESET associated with the second BPL, and
wherein resources of the first data and resources of the second data are overlapped in a time domain.

10. The terminal of claim 9,
wherein the first data comprises a first physical downlink shared channel (PDSCH) and the second data comprises a second PDSCH,
wherein the first PDSCH is associated with a third reference signal resource for a quasi co-located (QCL) relationship, the third reference signal resource indicated by the first control information, and
wherein the second PDSCH is associated with a fourth reference signal resource for a QCL relationship, the fourth reference signal resource indicated by the second control information.

11. The terminal of claim 10,
wherein the third reference signal resource is one of a set of reference signal resources indicated by a medium access control (MAC) control element (CE) associated with the primary BPL information, and
wherein the fourth reference signal resource is one of a set of reference signal resources indicated by a MAC CE associated with the secondary BPL information.

12. The terminal of claim 9, wherein the PUCCH is associated with a reference signal resource for a QCL relationship, indicated by an RRC signaling or a medium access control (MAC) control element (CE).

13. A base station (BS) in a wireless communication system, comprising:
at least one processor; and
at least one transceiver coupled to the at least one processor,
wherein the at least one processor is configured to:
transmit, to a terminal, configuration information via a radio resource control (RRC) signaling, wherein the configuration information includes:
information on a primary beam pair link (BPL) for resources of a first control resource set (CORESET) associated with a first physical downlink control channel (PDCCH); and
information on a secondary BPL for resources of a second CORESET associated with a second PDCCH;
transmit first control information based on the information on the primary BPL;
transmit second control information based on the information on the secondary BPL;
transmit first data allocated by the first control information and transmitting second data allocated by the second control information, wherein resources of the first data and resources of the second data are in a same time interval; and
receive feedback information in a slot through a physical uplink control channel, PUCCH, the feedback information including hybrid automatic repeat request (HARQ) acknowledgement (ACK)/negative ACK (NACK) information associated with the first data and HARQ ACK/NACK information associated with the second data,
wherein information of the first CORESET associated with the primary BPL is seperately allocated from information of the second CORESET associated with the second BPL, and
wherein resources of the first data and resources of the second data are overlapped in a time domain.

* * * * *